United States Patent [19]
Reeder

[11] Patent Number: 6,014,636
[45] Date of Patent: *Jan. 11, 2000

[54] POINT OF SALE METHOD AND SYSTEM

[75] Inventor: Kenneth Rodney Reeder, Flemington, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/851,923

[22] Filed: May 6, 1997

[51] Int. Cl.[7] .................................................. H04M 11/00
[52] U.S. Cl. ................................. 705/17; 705/16; 705/26; 705/27; 380/24
[58] Field of Search .................................. 705/17, 18, 19, 705/39, 40, 26, 27, 16; 380/24; 348/734

[56] References Cited

U.S. PATENT DOCUMENTS

| | | | |
|---|---|---|---|
| 4,926,325 | 5/1990 | Benton et al. | 705/39 |
| 5,053,607 | 10/1991 | Carlson et al. | 705/18 |
| 5,113,496 | 5/1992 | McCalley et al. | 710/126 |
| 5,336,870 | 8/1994 | Hughes | 235/379 |
| 5,371,797 | 12/1994 | Brunsky, Jr. | 380/24 |
| 5,590,197 | 12/1996 | Chen et al. | 380/24 |
| 5,689,100 | 11/1997 | Carrithers et al. | 235/380 |
| 5,704,046 | 12/1997 | Hogan | 705/19 |
| 5,724,424 | 3/1998 | Gifford | 380/24 |
| 5,727,163 | 3/1998 | Bezos | 705/27 |
| 5,754,655 | 5/1998 | Hughes et al. | 380/24 |
| 5,794,221 | 8/1998 | Egendorf | 705/40 |
| 5,825,881 | 10/1998 | Colvin, Sr. | 385/24 |
| 5,870,155 | 2/1999 | Erlin | 348/734 |
| 5,899,980 | 5/1999 | Wilf et al. | 705/26 |

FOREIGN PATENT DOCUMENTS

| | | | |
|---|---|---|---|
| 676823 | 3/1997 | WIPO | G06F 17/60 |
| 9817064 | 5/1998 | WIPO | H04N 7/00 |

*Primary Examiner*—Allen R. MacDonald
*Assistant Examiner*—Jagdish Patel

[57] ABSTRACT

A method for providing point-of-sale (POS) payment using interactive television (ITV) or the world wide web (WWW) by directly debiting a customer's bank account through electronic transfer of funds or by billing a customer's credit card account. The customer places an order for products or services on his ITV station, or through the WWW from his personal computer, and can make POS payment either by authorizing direct debit from his bank account or by authorizing a charge to his credit card account. The customer's debit and credit account information is collected by swiping the customer's debit or credit card through a magnetic stripe reader at the customer's location at the moment of sale.

39 Claims, 2 Drawing Sheets

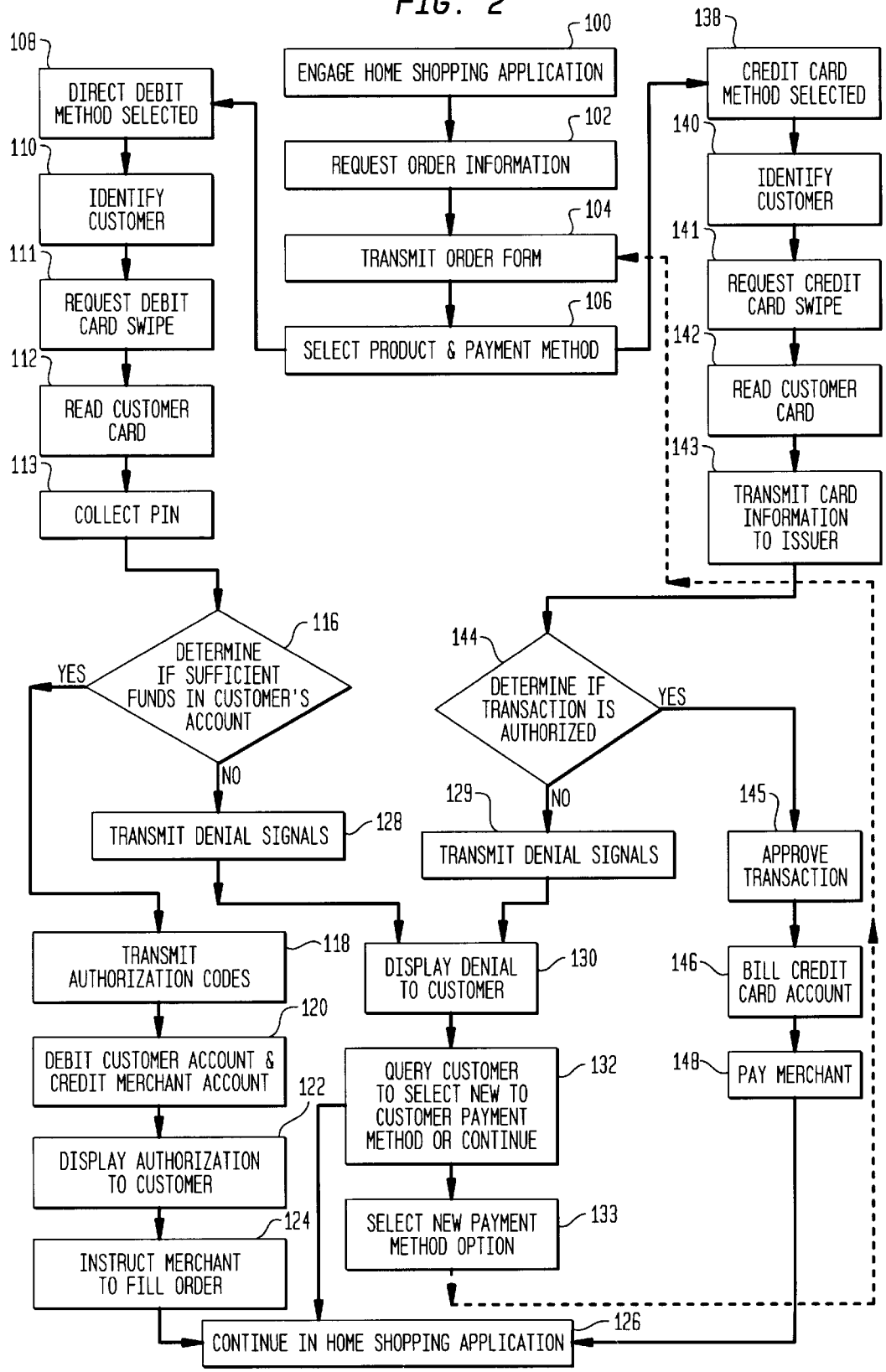

POINT OF SALE METHOD AND SYSTEM

BACKGROUND OF INVENTION

Field of Invention

This invention relates to a method for providing point-of-sale (POS) payment using interactive television (ITV) or the World Wide Web (WWW) to select and order merchandise from a merchant using a Set-Top Box (STB) card reader attached to the customer's personal computer or ITV station.

BACKGROUND DISCUSSION

Currently, there exist methods for providing POS payment for products and services by debiting a customer's bank account through electronic transfer of funds or by billing a customer's credit card. For example, some supermarkets have key pads very similar to those found in bank automatic teller machine (ATM) applications. A shopper in such a supermarket can elect to pay for his groceries by directly debiting his bank account. If the shopper so chooses, the shopper gives his ATM card to the supermarket cashier who swipes the card through a magnetic stripe reader on the key pad. The magnetic stripe reader reads the customer's bank account information contained on the magnetic stripe on the shopper's ATM card. The cashier then returns the shopper's ATM card to the shopper and hands the key pad to the customer who enters his personal identification number (PIN). The customer's bank account information and PIN is transmitted electronically through the ATM network to the customer's bank which either approves the debit and debits the customer's account or denies the debit. The approval or denial is electronically transmitted through the ATM network back to the supermarket.

Similarly, many merchants accept credit cards as a method of payment for products and services. A customer who elects to pay for products and services on a credit card gives his credit card to a cashier. The cashier swipes the credit card through a magnetic stripe reader on a device provided by the credit card issuer dedicated for the approval of credit card transactions. The magnetic stripe reader reads the customer's credit card information contained on a magnetic stripe on the customer's credit card. The cashier then returns the customer's credit card to the customer. The customer's credit card information is transmitted electronically to the customer's credit card issuer. The credit card issuer either approves or denies the credit and the approval or denial is electronically transmitted back to the merchant.

Those existing methods for POS payments have some distinct disadvantages. For example, to meet present banking industry standards, the customer must be physically present at the merchant's location, the merchant must have dedicated hardware at his location to initiate the credit or debit transaction and must physically swipe the customer's credit or debit card through a magnetic stripe reader and the merchant must make sure that approval of the debit or credit is received before fulfilling the order.

Furthermore, merchants have the ability to place detailed product and ordering information on the World Wide Web (WWW). This has usually consisted of product information in catalog form stored in a computer memory, or server, assigned to the merchant. This set of information is referred to as the merchant's web site, and may also include instructions on how the customer may order products from the merchant either through the WWW access or by other means. However, even if these methods include ways in which the customer may transmit credit or debt card information to the merchant, there has been no method to date where the merchant can verify the customer's credit information at the point of sale.

SUMMARY OF THE INVENTION

The above problems are solved in accordance with the principles of this invention by providing a method that allows a customer to make a POS payment for products or services using ITV or the WWW by swiping the customer's debit or credit card through a magnetic stripe reader at the customer's location at the moment of sale. After placing an order for products or services offered on ITV or the WWW, the customer can make a POS payment either by authorizing direct debit from his debit card account or bank account or by authorizing a charge to his credit card account. The customer's account information is collected by the ITV server or the service provider's web site when the customer is connected to ITV or WWW server's network or service provider's web site and is available to the service provider.

In the direct debit scenario, the customer's account information is transmitted from the ITV server or the WWW site to the ATM network. The customer's bank makes payment to the merchant who fulfills the customer's order for the products or services. The payment is made immediately by electronic transfer of funds through the ATM network.

In the credit card scenario, the customer's account information is transmitted from the ITV server to the credit card issuer. The credit card issuer makes payment to the merchant and the customer is billed on his credit card during the next billing period.

Thus, the customer need not be present at the merchant's location but can select merchandise and effectuate payment from his home using ITV or the WWW and a Set-Top Box (STB) magnetic stripe reader attached to the customer's ITV station or personal computer. Finally, the merchant need not verify approval of the debit or credit, that is done automatically through the ATM network or credit card network.

The method and apparatus of the invention, while particularly adapted to ITV or the WWW, can be used in a variety of similar broadband networks to provide point-of-sale payment for products and services without having to swipe the customer's debit or credit card through a magnetic stripe reader at the moment of sale.

BRIEF DESCRIPTION OF THE DRAWINGS

FIG. 2 is a flow diagram illustrating the method for providing point of sale payment in accordance with the invention.

DETAILED DESCRIPTION

Figure 1:
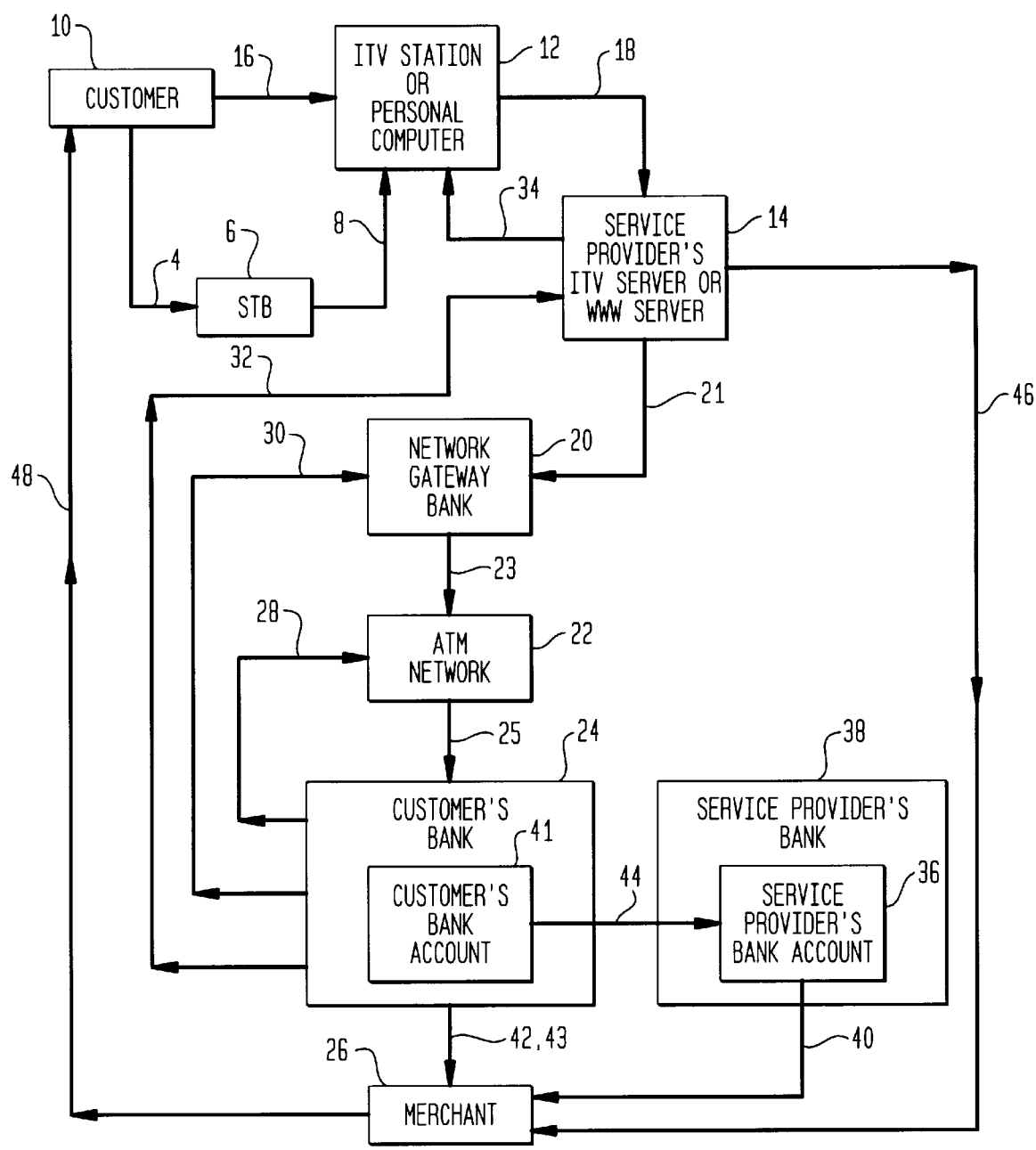
FIG. 1 is a block diagram of an exemplary embodiment of the invention.

Referring to FIG. 1, the customer (10) at a customer ITV station (12) is engaged in an ITV home-shopping application. In the ITV home shopping application, the customer can browse through products and services offered by vendors that sell their products and services on the network of an ITV server (14).

Assuming that the ITV customer (10) chooses to order a product or service being offered on the ITV server's (14) network, he would request order information via ITV. That order information would include an order form screen containing information the customer must complete to place an order. It is contemplated that each vendor will have its own order forms for particular products and services it offers because the information required to fulfill the order may differ depending on the type of product or service being ordered. For example, the order information required for food products will differ from the order information required for clothes.

The customer (10) can order the product service by entering order data (16) on to the order form using a virtual keyboard on the ITV or an ITV remote control key pad device similar to currently available television remote control devices. Either as a part of the order form or as part of a separate screen, the customer will be asked to choose a method of payment from a variety of payment options. The payment options will include, for example, a list of the customer's debit card and credit card accounts. The customer can select to debit any of his bank accounts or to bill any of his credit cards for the products or services he is ordering.

The customer's credit and/or debit card account information is transmitted to the service provider's ITV server (14) by swiping the customer's credit and/or debit cards in the STB magnetic stripe reader. If the customer PIN is to be provided to the ITV server, the customer enters his PIN on the ITV station virtual keyboard (12).

For security reasons, the customer's bank account information may not be displayed on the screen from which the customer selects payment options. The payment option screen merely contains descriptions from which the customer can identify which of his accounts is being debited or charged (e.g. First National Bank, Visa® card etc.). All members of a household sharing an ITV can have their respective accounts displayed on the ITV payment option screen.

Using either an ITV virtual keyboard or an ITV remote control key pad, the ITV customer (10) can select the method of payment from the ITV payment option screen. If the customer PIN has not been collected and stored by the ITV server, the customer may be asked to enter his PIN (16). Once the ITV customer (10) selects a payment option, an electronic signal (18) is sent from the customer ITV station (12) to the service provider's ITV server (14). That electronic signal contains an identification of the merchant whose products or services the customer has ordered, the cost of the order, the customer's chosen method of payment and a customer identification.

The customer identification is in the form of an electronic "address" assigned to the customer's ITV station (12). When the customer ITV station (12) is connected to the service provider's ITV server (14), the customer ITV station (12) is identified by a electronic address. That address can be encrypted into an ITV set top box which serves as an interface between the customer's ITV station (12) and the cable connected to the service provider's ITV server (14). That electronic address serves to identify the customer's ITV station (12) to the service provider's ITV server (14).

The identification of the customer ITV station (12) to the service provider's ITV server (14) enables the service provider's ITV server (14) to identify the particular account information of the service provider's ITV customer (10). The service provider's ITV server's (14) identification of the customer's account information along with the customer's selection of a payment option enables the service provider's ITV server (14) to begin the process whereby the customer's account is debited or charged for the products or services ordered.

In the direct debit scenario, the customer swipes his debit card through a magnetic card reader Set-Top-Box (STB) (6) which transmits (8) the customer's card information to the ITV station (12). The ITV station (12) then transmits (18) this information to the service provider's ITV server (14). The customer's account or debit card information is then electronically transmitted (21) to a network gateway bank (20). The network gateway bank (20) serves as an entry point to the ATM network (22). The customer's bank account or debit card information is electronically transmitted (23) from the network gateway bank (20) to the ATM network (22).

The ATM network (22) electronically transmits (25) the customer's bank account or debit card information to the proper customer bank (24). The current ATM network is provided with the necessary software to perform this function.

At the customer's bank (24), the ITV customer's (10) account is identified and the customer's bank (24) determines whether the ITV customer (10) has sufficient funds in his bank account (41) to pay the merchant (26) for the products or services ordered by the ITV customer (10). If sufficient funds are available, the customer's bank (24) dedicates and freezes the funds necessary to complete the sale and authorization code signals (28, 30, 32) are electronically transmitted from the customer's bank (24) to the ATM network (22), to the network gateway bank (20) and to the ITV server (14), respectively. If sufficient funds are not available, a denial signal is similarly electronically transmitted back through the ATM network (22), to the network gateway bank (20) and to the service provider's ITV server (14).

The ATM network (22) electronically debits the customer's account (41) and electronically transfers a credit (42, 43) to the merchant (26) or the merchant's bank account (not shown). Alternatively, the ATM network (22) can electronically debit the customer's account (41) and credit (44), the service provider's bank account (36) at the service provider's bank (38) and then electronically debit the service provider's bank account (36) and credit (40) the merchant (26). The credit received by the merchant will equal the cost of the products or services ordered by the customer less any transaction fees typical of those charged in the banking industry.

A notice of authorization or denial (34) of the order is sent from the service provider's ITV server (14) to the customer ITV station (12). Along with a notification of denial, the customer has the option of returning to the payment option screen and selecting an alternative payment method.

Upon receiving the authorization (32), the ITV server (14) electronically transmits a signal (46) to the merchant (26) to fulfill the customer's (10) order. The merchant (26) then fulfills the order (48).

The credit card scenario is very similar to the above described direct debit scenario. The principal difference is that either a ITV server or a network gateway bank serves as the entry point to the credit card network. The customer's credit card information is transmitted from the ITV server or network gateway bank to the credit card issuer and the credit card issuer either authorizes or denies the transaction. If authorized, the credit card issuer pays the merchant and bills the customer for the products or services ordered at the end of the billing period.

FIG. 2 is a flow diagram illustrating the method for providing point of sale payment in accordance with the invention. The customer (10) engaged in an ITV home shopping application (100) requests order information (step 102). In response to the customer's request (step 102), the service provider's ITV server (14) transmits order information, including an order form, to the customer ITV station (12) (step 104). As a part of the order information appearing on the customer ITV, the customer (10) is asked to select a payment option (step 106).

The customer (10) can select direct debiting of his bank account as the method of payment (step 108). The customer ITV station (12) signals the service provider's ITV server (14) with an identification of the merchant (26) whose products or services the customer (10) would like to order, the cost of the order, the customer's choice of direct debit of his bank account as the method of payment (step 108) and an identification of the customer (10) (step 110). In response to the customer's choice of debit of his bank account as the method of payment and the customer identification, the service provider's ITV server (14) requests (step 111) that the customer swipe the debit card through the STB magnetic card reader, reading customer bank account information stored on the card (step 112). The customer may be requested to enter a pin no. (step 113).

The customer bank account information is transmitted by the service provider's ITV server (14) to the network gateway bank (20), by the network gateway bank (20) to the ATM network (22) and by the AIM network to the customer bank (24) (step 114). The customer bank (24) determines whether the customer (10) has sufficient funds in his bank account to proceed with the transaction (step 116).

If sufficient funds are available, an authorization code is transmitted from the customer's bank (24) to the ATM network (22), from the ATM network (22) to the network gateway bank (20) and from the network gateway bank (20) to the service provider's ITV server (14) (step 118). The ATM network (22) debits the customer bank account at the customer bank (24) and credits the merchant (26) (step 120). The service provider's ITV server (14) transmits an authorization to the customer's ITV station (12) and the authorization appears on the customer's ITV station (12) (step 122) and the ITV server (14) instructs the merchant (26) to fulfill the customer's order (step 124). Thereafter, the customer can continue in the ITV home shopping application (step 126).

In lieu of selection of direct debiting of a bank account, the customer can select billing of his credit card as the method of payment (step 138) in response to the query to select a payment option (step 106). The customer's ITV station (12) signals the service provider's ITV server (14) with the identification of the merchant (26), cost of the order, choice of a credit card as the method of payment and identification of the customer (10) (step 140). The service provider's ITV server (14) requests that the customer swipe the credit card through the STB magnetic card reader (step 141), reading customer account information stored on the card (step 142).

The customer credit card information is transmitted by the service provider's ITV server (14) to the network gateway bank and by the network gateway bank to the credit card issuer (step 143). The credit card issuer determines whether the transaction is authorized (step 144). If the credit card issuer approves the transaction (step 145), the credit card issuer bills the customer's credit card account and pays the merchant (steps 146, 148). The service provider's ITV server (14) transmits an authorization to the customer's ITV station (12) and the authorization appears on the customer's ITV station (12) (step 122) and the ITV server (14) instructs the merchant (26) to fulfil the order (step 124). Thereafter, the customer can continue in the ITV home shopping application (step 126).

If the customer bank (24) determines that sufficient funds are not available in the customer bank account (step 116), a denial signal is transmitted from the customer bank (24) to the ATM network (22), from the ATM network (22) to the network gateway bank (20) and from the network gateway bank (20), to the service provider's service provider's ITV server (14) (step 128). Similarly, if the credit card issuer determines that the transaction is not authorized (step 146), a denial signal is transmitted from the credit card issuer to the network gateway bank (20) and from the network gateway bank (20) to the service provider's ITV server (14) (step 129). In response to a denial signal, the service provider's ITV server (14) transmits the denial to the customer's ITV station (12) and a denial notification appears on the customer's ITV station (12) (step 130). The ITV server queries the customer regarding selection of a new payment method (step 132). If the customer chooses to select a new payment method (step 133), the service provider's ITV server transmits the order information including a payment option screen to the customer's ITV station (12) (step 104). If the customer does not want to select an alternative payment option, the customer can continue in the ITV home shopping application (step 126).

The WWW scenario is very similar to the above described ITV scenario. The principal difference is that the customer accesses the merchant's product and ordering information through a personal computer (12), and the merchant's information is stored on the service provider's WWW web site server (14). Special software which enables the customer to access the information stored on the server (14) may be installed on the customer's personal computer (12).

The method can also be used for automated banking and billing payment. Using ITV or the WWW, the customer can transfer funds between his bank accounts; authorize scheduled debiting of his bank account, for example to pay his house mortgage; or authorize debiting of his bank account to pay aggregated transactions, for example to pay his telephone bill.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method for providing point-of-sale (POS) payment by a customer to a merchant in an interactive network including a terminal and a server coupled to a customer bank and to the merchant, performed at the time of sale, comprising the following steps:

transmitting an order form from the server to the customer using the interactive network;

receiving customer information, customer payment option information and customer order information in the order form at the server and performing the following steps:

(i) detecting customer account information corresponding to the customer information obtained from a card at the customer's location;

(ii) identifying the customer payment option information;

(iii) identifying a merchant corresponding to the customer order information;

(iv) transmitting to the customer bank the customer account information and the merchant information to permit manipulation of the customer account information for payment to the merchant of the customer order information; and (v) instructing the merchant to fill the customer order information.

2. The method for providing POS payment of claim 1, wherein the customer account information collected and stored includes customer bank account information.

3. The method for providing POS payment of claim 1, wherein the customer account information collected and stored includes customer credit card account information.

4. The method for providing POS payment of claim 1, wherein the customer order information includes identification of an ordered product or service and a cost for that product or service.

5. The method for providing POS payment of claim 4, wherein a customer bank account is debited by an amount equal to the cost of the product or service ordered.

6. The method for providing POS payment of claim 4, wherein a customer credit card account is charged an amount equal to the cost of the product or service ordered.

7. The method for providing POS payment of claim 4, further comprising crediting the merchant account by an amount equal to the cost of the product or service ordered less transactional fees.

8. The method for providing POS payment of claim 1, wherein the customer payment option information includes identification of a customer bank account.

9. The method for providing POS payment of claim 1, wherein the customer payment option information includes identification of a customer debit card account.

10. The method for providing POS payment of claim 1, wherein the customer payment option information includes identification of a customer credit card.

11. The method for providing POS payment of claim 1, wherein the transmission of customer account information and merchant account information to permit manipulation of the account balances includes transmission through an ATM network.

12. The method for providing POS payment of claim 1, wherein the transmission of customer account information and merchant account information to permit manipulation of the account balances includes transmission through a credit and issuer network.

13. The method for providing POS payment of claim 1, wherein said detecting step includes swiping said card through a magnetic card reader.

14. The method of claim 1 wherein the interactive network is an interactive television network and the terminal is a set top box.

15. The method of claim 1 wherein the interactive network is a distributed information network and the terminal is a computer terminal.

16. A method for providing point-of-sale (POS) payment for a transaction by a customer to a merchant in an interactive network including a terminal and a server coupled to a customer bank and to the merchant, comprising the steps of:

transmitting an order form from the server to the customer;

transmitting customer order information and customer payment option information in the order form over the single interactive network to the server and performing the following steps:

(i) detecting customer account information from a card at the customer's location using the terminal to facilitate manipulation of the customer account information;

(ii) transmitting the customer order information to a financial network to facilitate identification of the merchant and payment to the merchant of the customer order information by the customer bank; and (iii) instructing the merchant to fill the customer order information.

17. The method for providing POS payment of claim 16, wherein the customer account information transmitted includes customer bank account information.

18. The method for providing POS payment of claim 16, wherein the customer account information transmitted includes customer credit card account information.

19. The method for providing POS payment of claim 16, wherein the customer order information transmitted includes an ordered product or service and a cost for that product or service.

20. The method for providing POS payment of claim 16, wherein the customer payment option information transmitted includes an identification of a customer bank account.

21. The method for providing POS payment of claim 16, wherein the customer payment option information transmitted includes identification of a customer debit card.

22. The method for providing POS payment of claim 16, wherein the customer payment option information transmitted includes an identification of a customer credit card.

23. The method of providing POS payment of claim 16, wherein said detecting step includes swiping said card through a magnetic card reader.

24. The apparatus of claim 16 wherein the interactive network is an interactive television network and the terminal is a set top box.

25. The apparatus of claim 16 wherein the interactive network is a distributed information network and the terminal is a computer terminal.

26. An apparatus for providing point-of-sale (POS) payment by a customer to a merchant in an interactive network including a terminal and a server coupled to a customer bank and to the merchant, comprising:

means for transmitting an order form from the server to the customer, the server including means for performing the following functions:

(i) receiving customer information, customer payment option information and customer order information in the order form through transmission over the interactive network;

(ii) detecting customer account information from a card at the customer's location using the terminal, said customer account information corresponding to the customer information and the customer payment option information;

(iii) identifying a merchant corresponding to the customer order information;

(iv) transmitting the customer account information and the merchant information to permit manipulation of the customer account balance and payment to the merchant; and (v) instructing the merchant to fill the customer order information.

27. The apparatus for providing POS payment of claim 26, wherein the means for collecting and storing customer account information includes a means for collecting and storing customer bank account information.

28. The apparatus for providing POS payment of claim 26, wherein the means for collecting and storing customer account information includes a means for collecting and storing customer credit card account information.

29. The apparatus for providing POS payment of claim 26, wherein the means for receiving customer order information includes a means for receiving identification of an ordered product or service and a cost for that product or service.

30. The apparatus for providing POS payment of claim 29, wherein the means for transmitting customer account information and merchant account information to permit manipulation of the account balances includes a means for debiting a customer bank account by an amount equal to the cost of the product or service ordered.

31. The apparatus for providing POS payment of claim 29, wherein the means for transmitting customer account information and merchant account information to permit manipulation of the account balances includes a means for charging a customer credit card account by an amount equal to the cost of the product or service ordered.

32. The apparatus for providing POS payment of claim 29, wherein the means for transmitting customer account information and merchant account information to permit manipulation of the account balances includes a means for crediting the merchant account by an amount equal to the cost of the product or service ordered less transactional fees.

33. The apparatus for providing POS payment of claim 26, wherein the means for receiving customer payment option information includes a means for receiving identification of a customer bank account.

34. The apparatus for providing POS payment of claim 26, wherein the means for receiving customer payment option information includes a means for receiving identification of a customer debit card.

35. The apparatus for providing POS payment of claim 26, wherein the means for receiving customer payment option information includes a means for receiving identification of a customer credit card.

36. The apparatus for providing POS payment of claim 26, wherein said means for detecting customer account information is a magnetic card reader.

37. A method for providing point-of-sale (POS) payment by a customer to a merchant, performed at the time of sale, comprising the following steps, connecting the customer to a server;

coupling the server to a customer bank and a merchant;

transmitting an order form from the server to the customer;

receiving customer information, customer payment option information and customer order information in the order form at the server and performing the following steps:
  (i) detecting customer account information corresponding to the customer information obtained from a card at the customer's location;
  (ii) identifying the customer payment option information;
  (iii) transmitting the customer account information and the merchant information to the customer bank to manipulate the customer account information for payment to the merchant of the customer order information; and
  (iv) instructing the merchant to fill the customer order information.

38. A method for providing point-of-sale (POS) payment for a transaction by a customer with a merchant, comprising the steps of:

connecting the customer to a server;

coupling the server to a customer bank and a merchant;

transmitting an order form from the server to the customer;

transmitting customer order information and customer payment option information in the order form to the server and performing the following steps:
  (i) detecting customer account information from a card at the customer's location;
  (ii) transmitting the customer account information to the customer bank for payment to the merchant of the customer order information; and
  (iii) instructing the merchant to fill the customer order information.

39. An apparatus for providing point-of-sale (POS) payment by a customer to a merchant, comprising:

means for coupling a server to the customer, the merchant and a customer bank;

means for transmitting an order form from the server to the customer, the server including means for performing the following functions:
  (i) receiving customer information, customer payment option information and customer order information in the order form;
  (ii) detecting customer account information from a card, said customer account information corresponding to the customer information and the customer payment option information;
  (iii) transmitting the customer account information and the merchant information to a financial network for manipulation of the customer account information in the customer bank for payment to the merchant of the customer order information; and
  (iv) instructing the merchant to fill the customer order information.

* * * * *